2,581,683

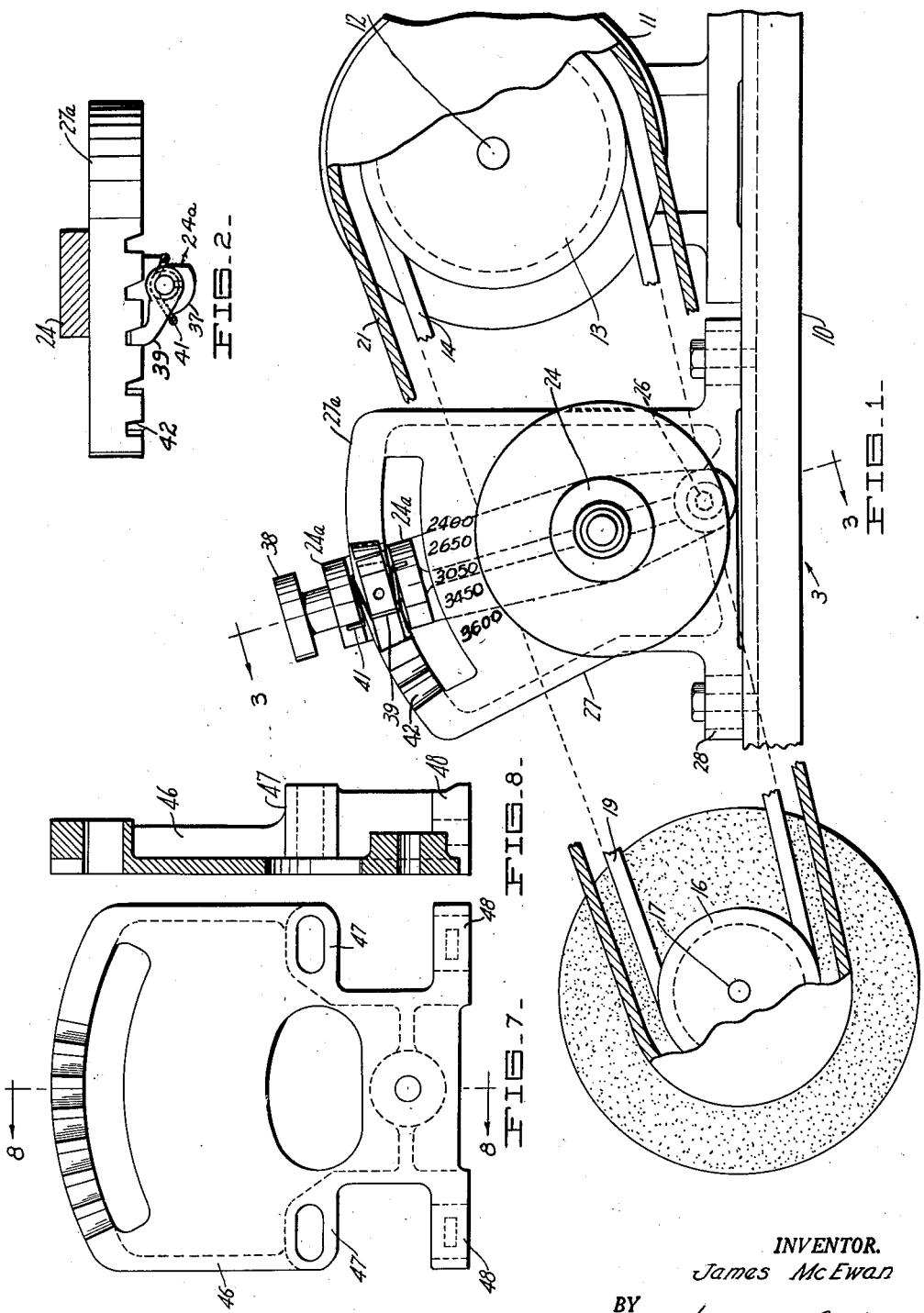

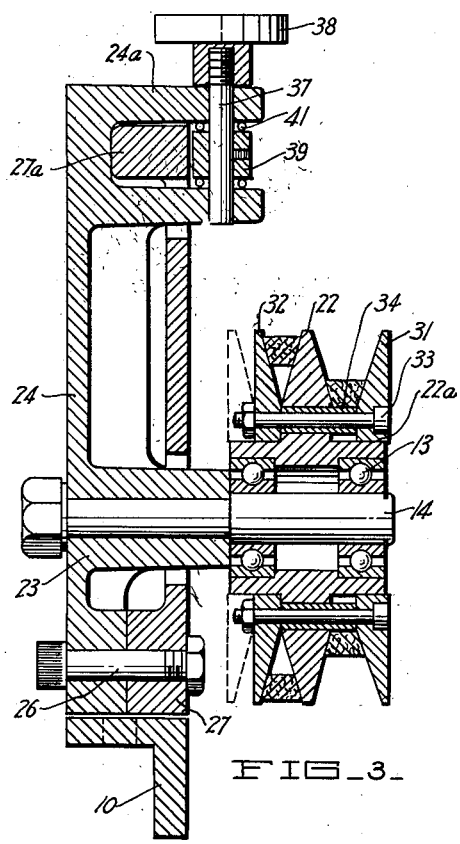
FIG_3_
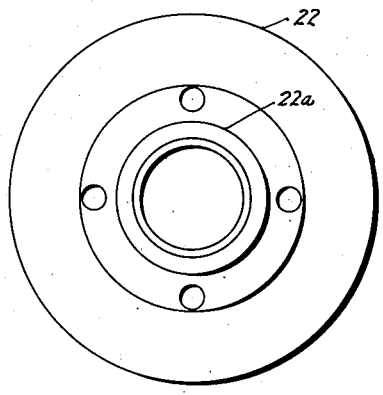
FIG_4_
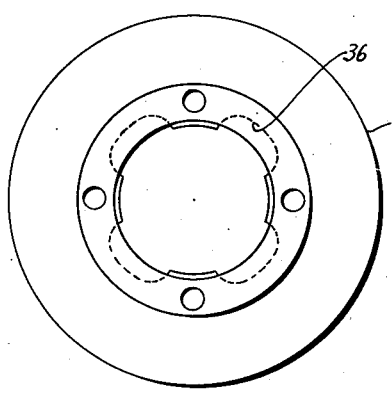
FIG_5_
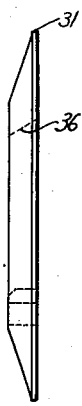
FIG_6_
INVENTOR.
James McEwan
BY
Harper Allen
ATTORNEY Patented Jan. 8, 1952

UNITED STATES PATENT OFFICE 2,581,683

VARIABLE-SPEED DRIVE

James McEwan, San Jose, Calif.

Application December 9, 1949, Serial No. 131,950

3 Claims. (Cl. 74—230.17)

The present invention relates to variable speed drives of a character adapted for easy use with various types of equipment, such as saw sharpeners for example, and is concerned more particularly with a drive of the above character which provides a positive control of the adjustment in the speed range provided without the possibility of misalignment of the drive parts during adjustment. Also the drive is constructed for economical manufacture and assembly and for automatic cooling of the pulleys and the belts associated therewith.

The above and other objects of the invention are attained in a preferred embodiment of the invention, as illustrated in the accompanying drawings, in which:

Figure 1 is a side elevational view of a variable drive assembly embodying the invention.

Figure 2 is a plan view of the rack and locking pawl of the drive assembly.

Figure 3 is a sectional view taken as indicated by the line 3—3 in Figure 1 with the belts shown in an extreme adjusted position thereof.

Figure 4 is a side elevational view of one of the center pulley elements.

Figure 5 is an inside elevational view of one of the shiftable pulley elements.

Figure 6 is a side elevational view of a shiftable pulley element.

Figure 7 is an elevational view of a modified form of bracket.

Figure 8 is a sectional view taken as indicated by the line 8—8 in Figure 7.

Referring to Figures 1 and 3 the drive assembly includes a supporting frame 10 which may be of a character disclosed in my co-pending application, Serial No. 779,001, filed October 10, 1947, for Saw Sharpener. Mounted on the support or bracket element 10 is a motor 11 whose drive shaft 12 is connected to a pulley 13 around which a V belt 14 is trained. At the opposite end of the support 10 there is provided a driven pulley 16 whose driven shaft 17 carries a sharpening element such as a grinding wheel, and this pulley 16 is engaged by a V belt 19. Preferably the pulleys 13, 16, and the belts 14, and 19 are enclosed by a guard 21.

The respective belts 14 and 19 at their inner ends cooperate with two sections of a variable drive structure which will now be described. The variable drive structure comprises a center pulley element 22 (Figure 3) of double-faced construction, which is journalled by respective bearings 13 on a support shaft 14. The shaft 14 is supported in and secured by bolting to a boss 23 of an adjusting lever 24 which is pivoted by a bolt 26 on a bracket 27. The bracket 27 is provided with opposite apertured feet 28 for mounting on the support bracket 10 by suitable fastening screws. Cooperating with the double-faced center pulley element 22 are a pair of opposite shiftable pulley elements 31 and 32 each of which is slidably mounted on a turned end 22a of the center element 22. The pulleys 31 and 32 are connected by a plurality of through bolts 33 having respective spacers 34 thereon and extending between the respective pulleys 31 and 32 through apertures in the pulley element 22 to insure the proper spacing therebetween. As seen in Figures 5 and 6 each of the pulley elements 31 and 32 are provided with cut-away portions 36 which provide openings for introduction of cooling air into the center of the variable drive assembly.

It is seen that by movement of the lever 24 about its pivot the center distances between the variable drive structure and the respective pulleys 13 and 16 will be changed so that the radial spacing of the respective belts 14 and 19 will be varied in opposite directions to vary the drive ratio in a well-known manner.

In order to accurately control the adjustment of the variable drive and to avoid misalignment of the drive parts due to distortion of their support, the lever 24 is provided with a forked upper end 24a which embraces an upper arcuate portion 27a of the bracket 27 with side surfaces of the lever and the bracket engaged with each other. On the side of the bracket 27, opposite the lever 24, the forked portions 24a are apertured to receive a stub-shaft 37 which carries an operating knob 38 at its upper end. Intermediate the forked portions 24a, there is secured on the stub-shaft 37 a locking pawl 39 which is spring-urged counterclockwise, as viewed in Figure 2, by a spring 41 to engage in a selected one of a series of notches 42 in the top bracket portion 27a. The numerals 2400 through 3600 appearing on the plate 27 in alignment with the respective notches 42 indicate the corresponding R. P. M. provided on the output shaft for a given R. P. M. of the input.

Preferably the angle of the face of the pawl 39 with respect to a notch 42 in the direction of the high-speed adjustment of the lever 24 (i. e., to the left in Figures 1 and 2), is such that the pawl will positively prevent such adjustment unless the operating knob 38 is turned to disengage the pawl 39 from a notch 42.

Referring to Figures 7 and 8 there is shown a modified form of bracket construction which can be mounted against either of two surfaces at right angles to each other depending upon the desired location of the variable drive unit. For this purpose the bracket 46 is provided with apertured bosses 47 for engagement against a surface at the side of the variable drive unit and at its bottom is provided with apertured feet 48 for mounting in the manner indicated in Figure 1 in connection with the bracket 27. The mounting of the variable drive elements and the control lever therefor on the bracket 46 is the same as that shown in Figure 1.

While I have shown and described certain preferred embodiments of the invention it will be understood that the invention is capable of variation and modification from the form shown so that its scope should be limited only by the scope of the claims appended hereto.

I claim:

1. A variable drive unit comprising respective driving and driven elements and a variable drive structure connected therebetween, a support bracket, a control lever mounted for pivoting movement on said support bracket and along one side face of said support bracket, the other side face of said bracket having a series of notches, a shaft carried by said lever and projecting through said support bracket and having said variable drive structure journalled thereon, a spring-urged pawl pivotally carried by said lever and disposed adjacent said series of notches for cooperation therewith, and a handle for operating said pawl to and from engagement with any selected one of said notches, said support bracket having respective sets of mounting bosses disposed at right angles to each other for selective positioning of said bracket.

2. A variable drive unit comprising respective driving and driven elements and a variable drive structure connected therebetween, a frame member for said drive unit, a support bracket attached to said frame and having an arcuate flange at one end thereof, a control lever pivotally mounted on said bracket about an axis concentric with said flange, and having a forked end embracing said flange and projecting beyond the flange, a latch pawl pivoted in the projecting portions of said forked end, a series of latching stations on said flange for engagement by said pawl, and a support shaft for said variable drive structure carried by said control lever.

3. A variable drive unit comprising respective driving and driven elements and a variable drive structure connected therebetween, a frame member for said drive unit, a support bracket attached to said frame and having an arcuate flange at one end thereof, a control lever pivotally mounted on said bracket about an axis concentric with said flange, and having a forked end embracing said flange and projecting beyond the flange, a latch pawl pivoted in the projecting portions of said forked end, a series of latching notches on said flange each having respective side surfaces for engagement by respective surfaces of said pawl, said pawl and a related latching notch having respective engaged surfaces so disposed with respect to the direction of movement of said lever to resist withdrawing movement of said pawl when pressure is applied through said lever and said pawl to said related notch in a direction to cause an increase of speed of the drive unit.

JAMES McEWAN.

REFERENCES CITED

The following references are of record in the file of this patent:

UNITED STATES PATENTS

| Number | Name | Date |
|---|---|---|
| 412,608 | Emerson | Oct. 8, 1889 |
| 1,900,222 | Bowen | Mar. 7, 1933 |
| 2,108,356 | Twomley | Feb. 15, 1938 |
| 2,235,122 | Shaw | Mar. 18, 1941 |
| 2,314,259 | Welty | Mar. 16, 1943 |
| 2,561,546 | Wallace | July 24, 1951 |

FOREIGN PATENTS

| Number | Country | Date |
|---|---|---|
| 20,894 | Great Britain | 1909 |